UNITED STATES PATENT OFFICE.

JOHN W. JONES, OF PORTLAND, MAINE.

IMPROVEMENT IN PROCESSES FOR CANNING MEATS.

Specification forming part of Letters Patent No. 217,226, dated July 8, 1879; application filed March 23, 1877.

*To all whom it may concern:*

Be it known that I, JOHN W. JONES, of Portland, in the county of Cumberland and State of Maine, have invented a new Method or Process of Canning and Consolidating Beef, of which the following is a specification.

My invention consists of the method or process of first canning and hermetically sealing beef or other meat, fowl, or fish, and cooking the same in the sealed cans, thus excluding water and at the same time preserving the juices and native aroma of the meat, &c.; and, secondly, in puncturing the can and compressing the same to expel the excess of water or juices of the meat not coagulable by heat.

My process may be conducted as follows, and I prefer a rather flat or easily compressible can having a bridge or other means for preventing the puncture from closing under pressure until the water and air are completely expelled from the can.

I take raw beef or other meat, fowl, or fish, and pack the same closely into cans and hermetically seal the cans. Now the sealed cans are placed in hot water—say, two and a half hours — until the contents are completely cooked in the air-tight can. Then the cans are punctured while hot and the excess of water or juice of the meat not coagulated by heat is completely expelled by compressing the can in a suitable press, and then the puncture is immediately sealed. Thus the beef or contents of the can are consolidated, and the cooling of the can further contracts the same and completes the compression and consolidation.

I am aware that beef previously cooked, or the more solid parts thereof, has been pressed into cans and then sealed up, and thus a firm article of beef has been made; but in this case the juices and jellies are partly lost, while in my process a richer and better and more abundant article of beef is obtained. Therefore my process is really an improvement.

I am aware that it is not new to preserve food by cooking the same within the sealed can, and that both raw and cooked meats have been pressed both before and after being placed in the cans; also, that it is not new to cook meats in the sealed cans and then allow the pressure of the atmosphere to act upon the cooling can, compressing the contents.

Having thus described my invention, I claim—

The above-described method of canning and hermetically sealing beef or other meat, fowl, or fish, and cooking the same in its own juice in the sealed can, thus excluding the water commonly used in boiling; and, secondly, puncturing the can and then compressing the same, in order to expel through the puncture the yet watery juice not coagulable by heat; and, finally, resealing the can, substantially as and for the purposes set forth.

In testimony that I claim the foregoing as my own I affix my signature in presence of two witnesses.

JOHN W. JONES.

Witnesses:
 DANIEL BREED,
 WARREN I. COLLAMER.